US008792821B2

(12) United States Patent
Treesh et al.

(10) Patent No.: US 8,792,821 B2
(45) Date of Patent: Jul. 29, 2014

(54) GATEWAY ROLLOUT

(75) Inventors: Frederick Treesh, Carlsbad, CA (US); Mark J. Miller, Vista, CA (US)

(73) Assignee: ViaSat, Inc., Carlsbad, CA (US)

( * ) Notice: Subject to any disclaimer, the term of this patent is extended or adjusted under 35 U.S.C. 154(b) by 238 days.

(21) Appl. No.: 13/463,079

(22) Filed: May 3, 2012

(65) Prior Publication Data
US 2012/0289225 A1 Nov. 15, 2012

Related U.S. Application Data

(62) Division of application No. 12/189,333, filed on Aug. 11, 2008, now Pat. No. 8,195,090.

(60) Provisional application No. 60/955,026, filed on Aug. 9, 2007.

(51) Int. Cl.
*H04B 7/185* (2006.01)

(52) U.S. Cl.
USPC .......... 455/13.1; 455/12.1; 455/427; 370/316

(58) Field of Classification Search
USPC .................. 455/13.2, 12.1, 427; 370/316
See application file for complete search history.

(56) References Cited

U.S. PATENT DOCUMENTS

| 6,941,107 | B2 * | 9/2005 | Chang et al. ................. 455/12.1 |
| 7,706,748 | B2 * | 4/2010 | Dutta ............................ 455/13.3 |
| 8,195,090 | B2 | 6/2012 | Treesh et al. |
| 2002/0039900 | A1 * | 4/2002 | Wiedeman et al. ........... 455/428 |
| 2002/0142781 | A1 * | 10/2002 | Wiedeman et al. ........... 455/456 |
| 2003/0045289 | A1 * | 3/2003 | Zhao et al. .................... 455/435 |
| 2003/0095064 | A1 | 5/2003 | Branscombe et al. |
| 2005/0118947 | A1 * | 6/2005 | Ames et al. ................... 455/12.1 |
| 2005/0197060 | A1 | 9/2005 | Hedinger et al. |
| 2005/0207375 | A1 | 9/2005 | Schiff |
| 2007/0116151 | A1 | 5/2007 | Thesling |
| 2007/0135051 | A1 * | 6/2007 | Zheng et al. ................. 455/63.1 |
| 2008/0144734 | A1 * | 6/2008 | Dankberg et al. ............. 375/267 |

OTHER PUBLICATIONS

International Search Report and Written Opinion for PCT/US08/72804, mailed on Nov. 10, 2008, 9 pages.
Restriction Requirement of Apr. 28, 2011 for U.S. Appl. No. 12/189,333, 6 pages.
Non-Final Office Action of Aug. 18, 2011 for U.S. Appl. No. 12/189,333, 18 pages.
Notice of Allowance of Mar. 3, 2012 for U.S. Appl. No. 12/189,333, 7 pages.
European Search Report for EPO Patent Application No. 08797623.9 mailed Jun. 4, 2014, 7 pages.

* cited by examiner

*Primary Examiner* — Danh Le
(74) *Attorney, Agent, or Firm* — Kilpatrick Townsend & Stockton LLP

(57) ABSTRACT

A method for providing satellite communications coverage for a geographical area includes operating a plurality of gateways including a first gateway and a second gateway. The first gateway is configured to utilize at least one first spot beam associated with at least one first coverage area, and the second gateway is configured to utilize at least one second spot beam associated with at least one second coverage area. As part of a phased deployment, the at least one second coverage area is expanded to include at least one third coverage area, and the second gateway is configured to provide relayed satellite communications to the plurality of second subscriber terminals located in the at least one second coverage area and to a plurality of third subscriber terminals located in the at least one third coverage area.

16 Claims, 8 Drawing Sheets

| Modcode 205 | Signal Quality Range (SNR) 210 |
|---|---|
| QPSK 1/4 | Range 1 |
| QPSK 1/3 | Range 2 |
| QPSK 2/5 | Range 3 |
| QPSK 1/2 | Range 4 |
| QPSK 3/5 | Range 5 |
| QPSK 2/3 | Range 6 |
| QPSK 3/4 | Range 7 |
| QPSK 4/5 | Range 8 |
| QPSK 5/6 | Range 9 |
| QPSK 8/9 | Range 10 |
| QPSK 9/10 | Range 11 |
| 8PSK 3/5 | Range 12 |
| 8PSK 2/3 | Range 13 |
| 8PSK 3/4 | Range 14 |
| 8PSK 5/6 | Range 15 |
| 8PSK 8/9 | Range 16 |
| 8PSK 9/10 | Range 17 |
| 16APSK 2/3 | Range 18 |
| 16APSK 3/4 | Range 19 |
| 16APSK 4/5 | Range 20 |
| 16APSK 5/6 | Range 21 |
| 16APSK 8/9 | Range 22 |
| 16APSK 9/10 | Range 23 |
| 32APSK 3/4 | Range 24 |
| 32APSK 4/5 | Range 25 |
| 32APSK 5/6 | Range 26 |
| 32APSK 8/9 | Range 27 |
| 32APSK 9/10 | Range 28 |

| MAC Addr 255 | SNR 260 |
|---|---|
| MAC Addr 1 | A |
| MAC Addr 2 | B |
| MAC Addr 3 | C |
| MAC Addr 4 | D |
| MAC Addr 5 | E |
| MAC Addr 6 | F |
| MAC Addr 7 | G |
| ⋮ | ⋮ |
| MAC Addr $n$ | N |

GATEWAY ROLLOUT

CROSS-REFERENCES TO RELATED APPLICATIONS

This application is a divisional of U.S. Nonprovisional application Ser. No. 12/189,333, filed Aug. 11, 2008, which claims the benefit of priority to U.S. Provisional Application No. 60/955,026, filed Aug. 9, 2007, the disclosures of which are incorporated herein by reference in their entirety for all purposes.

This application incorporates by reference for all purposes U.S. Nonprovisional application Ser. No. 12/176,629, filed Jul. 21, 2008.

BACKGROUND OF THE INVENTION

The present invention relates to satellite communication systems, and more particularly to satellite communication systems having multiple spot beams that serve as communication links between multiple coupled gateways and a plurality of subscriber terminals, wherein the satellite communication systems can provide virtual gateway redundancy without having to reserve platform resources.

Telecommunications and data communications are interconnected over heterogeneous networks via gateways. Gateways can be located in various locations geographically separated from each other. A gateway is a communication device that interconnects networks at higher layers than routers and converts a communication protocol to another communication protocol. Examples of telecommunication protocols are Frame Relay, ISDN; HDLC, X.25, T1/E1, T3/E3, ATM, SONET/SDH, etc. TCP/IP is a well-known data communication protocol, which is used for Internet communication. Gateways in this description mean generally gateways, routers, switched communication equipment, access nodes, hubs, ground stations, satellite earth stations that translate communication signals between subscriber terminals and services servers via a satellite. Examples of services servers are multimedia servers, email servers, voice mail servers, video-on-demand servers, etc. Terrestrial gateways may comprise a signaling interface to a telephone network such as the Public Switched Telephone Network (PSTN), the Mobile Network through a switching center, and/or an Internet Protocol (IP) network.

Many contemporary service providers are national or multinational in nature. Therefore, they provide services that may span several geographical areas and require several gateways. Service providers sometimes even cooperate with each other to expand their networks. For that, their gateways must be interconnected. In order to guarantee a committed capacity and service up-time, service providers must resort to setting redundant (or backup) gateways, which become active in case primary gateways fail. This create issues regarding the number of idle gateways as well as the inefficient utilization of the existing resources. This lack of full utilization is expensive, especially considering the cost of waste physical storage space and network utilization.

An example of monitoring whether or not a gateway in the interconnect network is active and available is to exchange "keepalive" messages across the connection. If the keepalive messages are not received within a specified interval, the interface protocol connection is dropped, and the gateway will be removed. Gateways in the normal operation may use certain routing algorithm concepts to keep update the Internet Protocol (IP) address of the next-hop gateway in specified intervals. For example, the distance vector routing (also referred as Bellman-Ford Algorithm) algorithm and the link-state routing algorithm are known to one of skill in the art. RIP is a very simple distance-vector based routing protocol. BGP is another distance-vector based routing protocol. A distance vector protocol has each gateway transmit (Destination Address, cost) pairs to that gateway's neighbors. There are two types of RIP formats documented in RFC 1058 and RFC 2453. In the link-state routing, each gateway is responsible for meeting its neighbor and learning their names. Each gateway constructs a packet known as a link-state packet (LSP), which contains a list of the names of and cost to each of its neighbor. The LSP is transmitted to all the other gateways, and each gateway stores the most recently generated LSP from each other. Each gateway, armed with the information in the LSPs, computes routes to each destination. The Dijkstra Algorithm may be used for computing of routes.

Large network service providers such as AT&T and Sprint have routing information for all their network addresses. Their gateways exchange information using Exterior Gateway Protocols, with Border Gateway Protocol version 4 (BGP-4) being the standard and documented in RFC 1771. Gateways use TCP connection to exchange information with neighboring gateways. When a gateway is not available, each end of the connection withdraws all routes going through the now-unavailable neighbor. It is understood that routing protocols are evolving, and they are likely to be obsolete by other RFCs and/or newer versions.

The vast majority of subscribers in urban or suburban areas are served by either hybrid fiber coaxial, cable, or ADSL networks. Both cable and ADSL rely on physical wires to provide network access. The capital expenditure depends on the geographic distance between subscribers and access nodes. The infrastructure cost is shared by all subscribers residing in the area. When the subscriber density is low, such as in the rural or remote areas, the wired infrastructures are too costly to be deployed. An alternative solution is routing information signals to the destined subscriber terminals via satellite. A transmitter at the gateway uplinks the information signals to the satellite, which frequency converts them and forwards them to the destined geographical area through its multiple spot beams.

The satellite is conceptually similar to a base station in a cellular communications network, where the base station is located at a very high altitude above the earth. A geostationary (GEO) satellite is in orbit about 36,000 km above the equator, and its revolution around the Earth is synchronized with the Earth's rotation. Therefore, the GEO satellite appears stationary, i.e., fixed on the Earth's surface.

Like a cellular infrastructure, a satellite network can divide the covered geography (footprint) into many smaller footprints using multi-beam antennas. Gateways in the footprint of one spot beam can communicate with subscriber terminals located in footprints of other spot beams. The term spot beam refers to a directional radiation pattern provided by a satellite antenna in which the area of geographical coverage is constrained to a footprint having a line of sight to the satellite. The spot beams can carry two-way communications, sent in packets at specific time intervals and allotted frequencies. And all wireless technologies for cellular communications such as CDMA, FDMA and TDMA technologies and the combination thereof can also be applied to the satellite communication. Similar to cellular communication networks that employ frequency reuse to maximize bandwidth efficiency, a satellite communication system has the additional advantage of employing orthogonal polarization to further increase available bandwidth.

A spot-beam satellite system may comprise a plurality of orthogonal time or frequency slots (defined as color patterns), a plurality of frequency re-use patterns that can be regular in structures, where a uniformly distributed capacity is required, and a plurality of spot beams.

In a spot-beam satellite system, it is desirable to have gateway redundancy to significantly lessen or eliminate any shortfall against the system's committed capacity during temporary gateway outage periods. The outage could be caused by natural disasters or routine maintenance. In a system with a large number of gateways and user service beams, this can mean adding significant spacecraft platform resources to enable a backup gateway to take over the beams of another gateway.

It is also desirable to have the capability of a phased gateway build-out during the system's early stages without sacrificing coverage over the full service area.

BRIEF SUMMARY OF THE INVENTION

The present invention relates to a method and system for providing satellite communications coverage for a geographical area. This may involve operating multiple gateways including at least a first gateway and a second gateway, wherein the first and second gateways may be interconnected through a communication network. The first gateway is configured to utilize at least one first spot beam associated with at least one first coverage area within the geographic area to provide relayed satellite communications to a number of first subscriber terminals located in the at least one first coverage area. The second gateway is configured to utilize at least one second spot beam associated with at least one second coverage area within the geographic area to provide relayed satellite communications to a number of second subscriber terminals located in the at least one second coverage area. The at least one first and second coverage areas may be adjacent. Upon a failure condition associated with the first spot beam, the at least one second coverage area is expanded to provide relayed satellite communications to some of the first subscriber terminals without utilizing the first spot beam.

In one embodiment of the present invention, the second spot beam includes at least two second spot beams associated with at least two second coverage areas that are expanded upon the failure condition. Prior to expanding the at least two second coverage areas, the at least two second spot beams may be configured to utilize a common color of frequency and polarization. Upon expanding the at least two second coverage areas, the at least two second spot beams can be configured to utilize distinct colors of frequency and polarization to reduce effects of interference with one another. Under certain expansion conditions, the at least two second spot beams can use separate frequency bands and/or different polarizations.

In another embodiment of the present invention, the method may use adaptive coding and modulation to expand the second spot beam(s).

In yet another embodiment of the present invention, the method may increase transmission power to expand the second spot beam(s).

The following detailed description together with the accompanying drawings will provide a better understanding of the nature and advantages of the present invention.

BRIEF SUMMARY OF THE DRAWINGS

FIG. 2B shows an exemplary modcode table according to one embodiment of the present invention.

FIG. 2C shows an exemplary Address-SNR table according to one embodiment of the present invention.

DETAILED DESCRIPTION OF THE INVENTION

Figure 1:
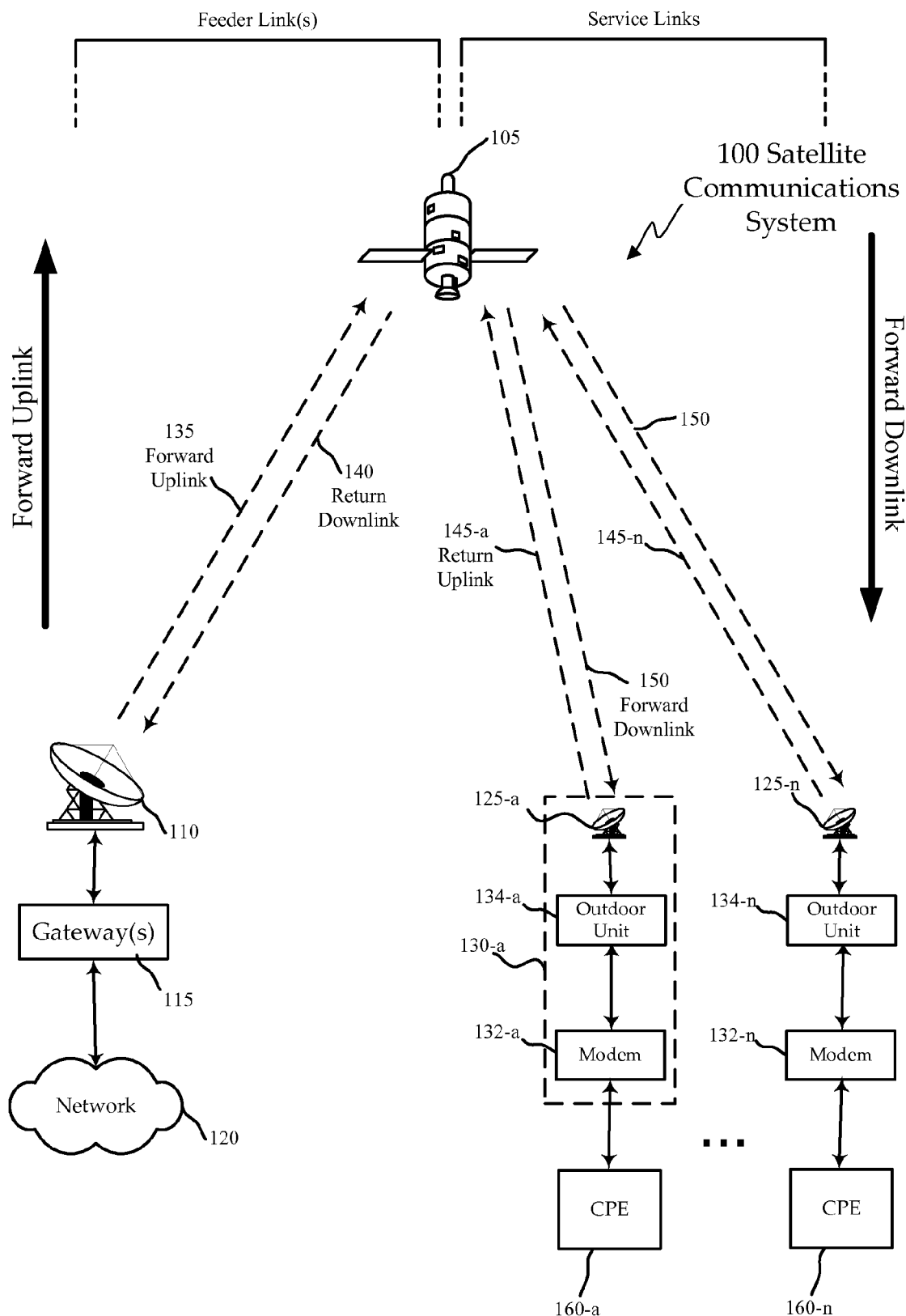
FIG. 1 shows a block diagram of an exemplary satellite communications system according to one embodiment of the present invention.

FIG. 1 shows a block diagram of an exemplary satellite communications system 100 configured according to various embodiments of the invention. The satellite communications system 100 includes a network 120, such as the Internet, interfaced with one or more gateways 115 that is configured to communicate with one or more subscriber terminals 130, via a satellite 105.

The gateway 115 is sometimes referred to as a router, switch, access node, hub, or satellite ground station and services the feeder links 135, 140 to and from the satellite 105. Although only one gateway 115 is shown, this embodiment has a number of gateways all coupled to the network 120, for example, twenty or forty gateways. The gateway 115 schedules traffic to the subscriber terminals 130, although other embodiments could perform scheduling in other parts of the satellite communication system 100.

Subscriber or user terminals 130 include an outdoor unit 134, a satellite modem 132 and an antenna 125. Although the satellite communications system 100 is illustrated as a geostationary satellite based communication system, it should be noted that various embodiments described herein are not limited to use in geostationary satellite based systems, for example some embodiments could be low earth orbit (LEO)

satellite based systems. Some embodiments could have one satellite 105, while others could have more satellites working together in concert.

A satellite communications system 100 applicable to various embodiments of the invention is broadly set forth herein. In this embodiment, there is a predetermined amount of frequency spectrum available for transmission. The feeder links may use the same or overlapping frequencies with the service links or could use different frequencies. The gateways 115 could be placed outside the service beams when frequencies are reused.

The network 120 may be any type of network and can include, for example, the Internet, an IP network, an intranet, a wide-area network (WAN), a local-area network (LAN), a virtual private network (VPN), a fiber optical network, a hybrid fiber-coax network, a cable network, the Public Switched Telephone Network (PSTN), the Public Switched Data Network (PSDN), a public land mobile network, and/or any other type of network supporting data communication between devices described herein, in different embodiments. The network 120 may include both wired and wireless connections, including optical links. As illustrated in a number of embodiments, the network may connect the gateway 115 with other gateways (not pictured), which are also in communication with the satellite 105.

The gateway 115 provides an interface between the network 120 and the satellite 105. The gateway 115 may be configured to receive data and information directed to one or more subscriber terminals 130, and can format the data and information for delivery to the respective destination device via the satellite 105. Similarly, the gateway 115 may be configured to receive signals from the satellite 105 (e.g., from one or more subscriber terminals 130) directed to a destination connected with the network 120, and can format the received signals for transmission with the network 120. The gateway 115 may use a broadcast signal, with a modulation and coding ("modcode") format adapted for each packet to the link conditions of the terminal 130 or set of terminals 130 to which the packet is directed (e.g., to account for the variable service link 150 conditions from the satellite 105 to each respective terminal 130).

A device (not shown) connected to the network 120 may communicate with one or more subscriber terminals 130 and through the gateway 115. Data and information, for example Internet protocol (IP) datagrams, may be sent from the device in the network 120 to the gateway 115. The gateway 115 may format a Medium Access Control (MAC) frame in accordance with a physical layer definition for transmission to the satellite 130. A variety of physical layer transmission modulation and coding techniques may be used with certain embodiments of the invention, including those defined with the DVB-S2 that is developed in 2003 and ratified by ETSI (EN 302 307), DOCSIS (Data Over Cable Service Interface Specification developed by Cable Labs), and WiMAX (The Worldwide interoperability for Microwave Access based on the IEEE802.16) standards. The link 135 from the gateway 115 to the satellite 105 is referred to hereinafter as the forward uplink 135.

The gateway 115 may use an antenna 110 to transmit the forward uplink signal to the satellite 105. In one embodiment, the antenna 110 comprises a parabolic reflector with high directivity in the direction of the satellite 105 and low directivity in other directions. The antenna 110 may comprise a variety of alternative configurations and include operating features such as high isolation between orthogonal polarizations, high efficiency in the operational frequency bands, high gain and low noise.

In one embodiment of the present invention, a geostationary satellite 105 is configured to receive the signals from the location of antenna 110 and within the frequency band and specific polarization transmitted. The satellite 105 may, for example, use a reflector antenna, lens antenna, phased array antenna, active antenna, or other mechanism known in the art for reception of such signals. The signals received from the gateway 115 are amplified with a low-noise amplifier (LNA) and then frequency converted (transponded) to a transmit frequency. The satellite 105 may process the signals received from the gateway 115 and forward the signal from the gateway 115 to one or more subscriber terminals 130. In one embodiment of the present invention, the frequency-converted signals are passed through a demultiplexer that separate the various received signals into their respective frequency bands. The separate signals may be amplified by TWT amplifiers, one for each frequency band and are combined in a multiplexer to form the high-power transmission signals. The high-power transmission signal passed through a transmit reflector antenna (e.g., a phased array antenna) that forms the transmission radiation pattern (spot beam). In one embodiment of the present invention, the satellite 105 may operate in a multi-beam mode, transmitting a number of narrow beams each directed at a different region of the earth, allowing for segregating subscriber terminals 130 into the various narrow beams. With such a multi-beam satellite 105, there may be any number of different signal switching configurations on the satellite 105, allowing signals from a single gateway 115 to be switched between different spot beams.

In another embodiment of the present invention, the satellite 105 may be configured as a "bent pipe" satellite, wherein the satellite 105 may frequency and polarization convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention. Adaptive coding and modulation can be used in some embodiments.

For other embodiments of the present invention, a number of network architectures consisting of space and ground segments may be used, in which the space segment is one or more satellites while the ground segment comprises of subscriber terminals, gateways, network operations centers (NOCs) and a satellite management center (SMC). The satellites can be GEO or LEO satellites. The gateways and the satellites can be connected via a mesh network or a star network, as evident to those skilled in the art.

The service link signals are transmitted from the satellite 105 to one or more subscriber terminals 130 and received with the respective subscriber antenna 125. In one embodiment, the antenna 125 and terminal 130 together comprise a very small aperture terminal (VSAT), with the antenna 125 measuring approximately 0.6 meter in diameter and having approximately 2 watts of power. In other embodiments, a variety of other types of antennas 125 may be used at the subscriber terminal 130 to receive the signal from the satellite 105. The link 150 from the satellite 105 to the subscriber terminals 130 may be referred to hereinafter as the downstream downlink 150. Each of the subscriber terminals 130 may comprise a single user terminal or, alternatively, comprise a hub or router (not pictured) that is coupled to multiple user terminals. Each subscriber terminal 130 may be connected to various consumer premises equipment (CPE) 160 comprising, for example computers, local area networks, Internet appliances, wireless networks, etc.

In one embodiment, a Multi-Frequency Time-Division Multiple Access (MF-TDMA) scheme is used for return links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is also employed in each frequency channel. In this scheme, each frequency channel may be divided into several timeslots that can be assigned to a connection (i.e., a subscriber terminal 130). In other embodiments, one or more of the return links 140, 145 may be configured with other schemes, such as Frequency Division Multiple Access (FDMA), Orthogonal Frequency Division Multiple Access (OFDMA), Code Division Multiple Access (CDMA), and/or any number of hybrid or other schemes known in the art.

A subscriber terminal, for example 130-*a*, may transmit data and information to a destination on the network 120 via the satellite 105. The subscriber terminal 130 transmits the signals via the return uplink 145-*a* to the satellite 105 using the antenna 125-*a*. A subscriber terminal 130 may transmit the signals according to a variety of physical layer transmission modulation and coding techniques. In various embodiments, the physical layer techniques may be the same for each of the links 135, 140, 145, 150, or they may be different. The link from the satellite 105 to the gateway 115 may be referred to hereinafter as the return downlink 140.

Figure 2A:
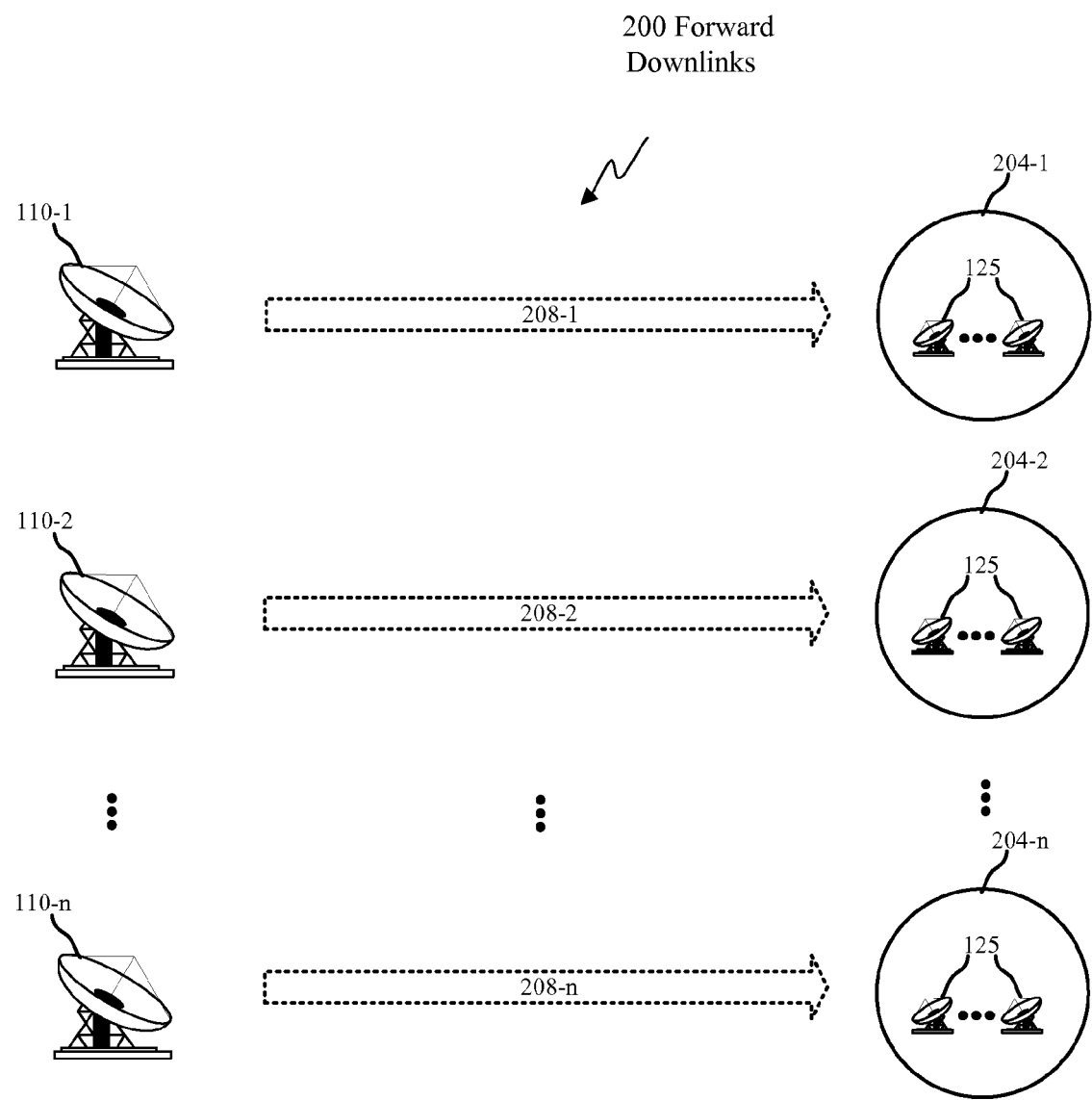
FIG. 2A shows a block diagram of forward downlinks (spot beams), each beam associated with a corresponding gateway according to one embodiment of the present invention.

FIG. 2A shows an exemplary diagram 200 of forward downlinks according to an embodiment of the present invention. Antennas 110-1 to 110-*n* are associated with the respective gateways 115-1 to 115-*n*, each gateway is assigned a forward channel 208 through the satellite 105 to a spot beam 204. A number of subscriber terminal (ST) antennas 125 are configured in the spot beam 204 to capture the forward downlink channel 208. The ST 130 are distributed among the n spot beams 204 based generally upon their presence within a particular spot beam 204. There are places where the spot beams 204 overlap such that a particular subscriber terminal 130 could be allocated to one or another spot beam 204.

The return feeder link 140 is separated from the service forward downlink 150 using some sort of orthogonality, for example, temporal, spatial, frequency, and/or polarization. In one embodiment, the upstream feeder link 140 has a feeder spot beam that is geographically separated from the service spot beams, but any type of orthoganality could accomplish the separation.

FIG. 2B shows an example of a modulation and coding (modcode) table 202 according to one embodiment of the present invention. This form of modcode table 202 may, for example, be used by a gateway 115 to determine the modcode to be used for packets destined for a subscriber terminal operating in a given signal quality range. The table contains a column listing a number of modcode formats 205. Each modcode format 205 corresponds to a specified signal quality range 210. The signal quality range may provide some knowledge on the channel for an associated region. For example, the signal quality range 210 can be defined as the signal-to-interference-plus-noise (SINR) ratio that may be measured at the subscriber terminals and reported back to the gateway. Bit error rates (BER) and/or packet error rates (PER) can be extracted from a cyclic redundant check (CRC) calculation. Thus, using the signal quality attributed to a destination link for a packet, a signal quality range 210 encompassing the link may be identified, and the appropriate modcode may be selected.

In other embodiments of the present invention, other signal quality indicators may be used, such as a measured signal to noise ratio, an estimated signal to noise ratio, a bit error rate, a received power level, or any other communication link quality indicator. It is also worth noting that a number of other data structures may also be used to relate signal quality ranges to modcodes. In one embodiment, each signal quality is associated with a different packet forwarding queue. In still other embodiments, other information density parameters in addition to modcode changes may be added to further adapt a signal to environmental or other conditions.

FIG. 2C shows an example of an address/SNR table 250. This form of address/SNR table 250 may, for example, be used by a gateway 115 to lookup the signal quality 260 of a subscriber terminal 130 to which a packet is destined, based on the destination address 255. The tables in FIGS. 2B and 2C may be embodied on one or more memories, which may be either on or off chip, and may be used in conjunction with one another to correlate a MAC address with a particular modcode format.

Although a destination MAC address is used in this example, other mechanisms may be used to identify particular subscriber terminals, including destination VLAN-ID, a Destination Internet Protocol address, a private addressing ID, any other set of data comprising or otherwise correlated with a destination address. The data address may be parsed from a received data packet after arrival at a device, or it may be received in any other manner known in the art. It is also worth noting that a number of other data structures may also be used to relate an address to signal quality.

Once a modcode for a particular packet or packets is identified, for example using the modcode table 202, it may then be encapsulated, coded, mapped and transmitted in a variety of ways, as known in the art. One way to implement an adaptive coding and modulation (ACM) is via the DVB-S2 standard, which specifically provides for its use. As noted above, ACM may change the modulation format and Forward Error Correction (FEC) codes (modcodes) to best match the current link conditions. This adaptation may occur on a frame by frame basis. The discussion that follows assumes an IP based packet network in the context of a DVB-S2 satellite transmission system, but the concepts may be applied for a variety of systems, including systems implementing DOCSIS or WiMAX.

Figure 3:
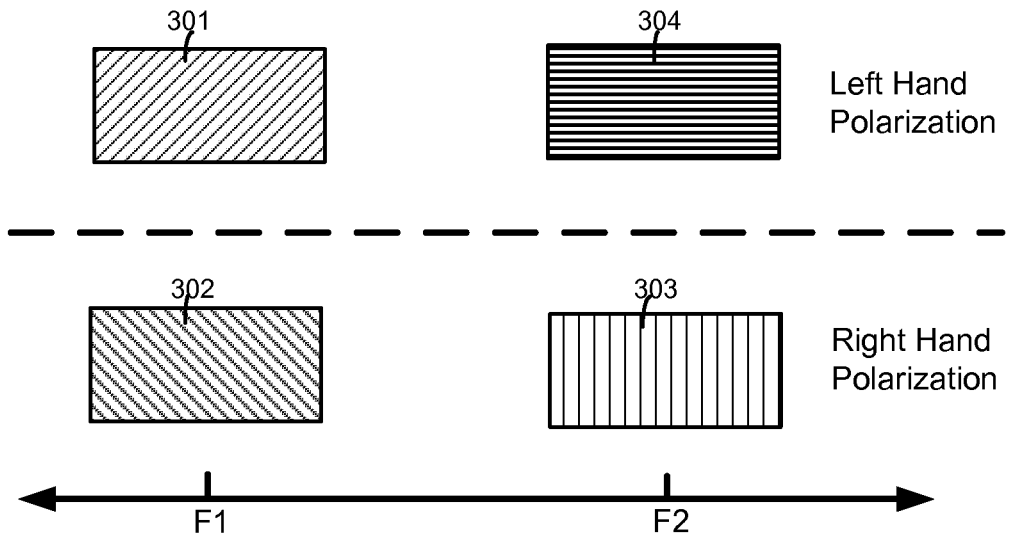
FIG. 3 shows an example of a four-color pattern in block diagram form according to one embodiment of the present invention.

FIG. 3 is a sample four color allocation in block diagram form. Each color pattern may be used for a respective service spot beam in one embodiment of the present invention. For example, colors 301 and 302 use the same frequency range F1, but color 301 is left-hand polarized and color 302 is right-hand polarized. Similarly, colors 303 and 304 share the frequency range F2, but color 303 uses the right hand polarization whereas color 304 uses the left hand polarization. It is understood that this color allocation and associated restrictions serve as illustration only and are not meant to be limitation. In other embodiment of the present invention, patterns with even more colors can also be used.

Figure 4:
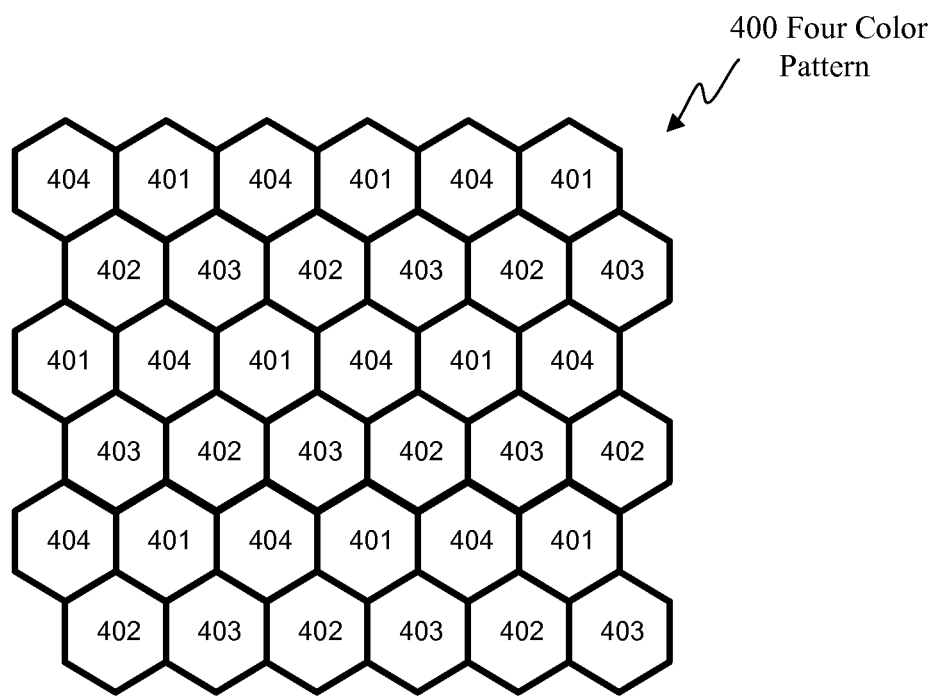
FIG. 4 shows an exemplary four-color spot beam pattern in accordance with one embodiment of the present invention.

FIG. 4 shows a 2D diagram 400 of an embodiment of the present invention having a four-color spot beam pattern. The pattern ensures that no directly adjacent spot beams use the same color. Orthogonality is achieved by the use of the different colors. For example, spot beam 401 could use color 301, spot beam 402 could use color 302, spot beam 403 could use color 303, and spot beam 404 could use color 304. The spot beams are shown as hexagon shaped, but are more circular or oval in shape such that there is overlap between the spot beams 401, 402, 403, and 404.

Figure 5:
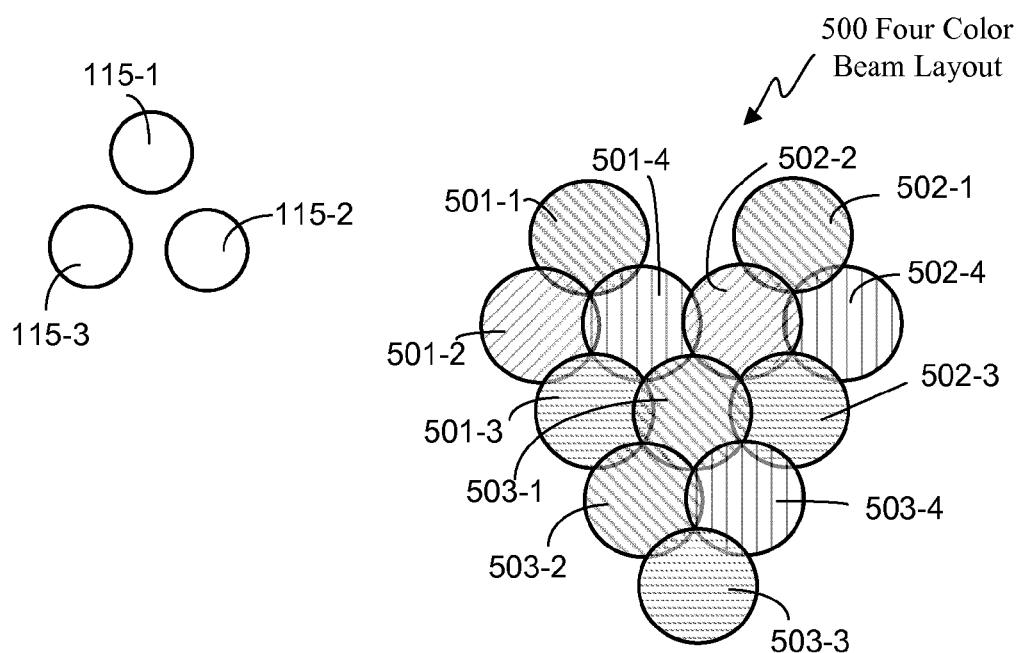
FIG. 5 shows an exemplary beam layout in block diagram form of three separated gateways having 4 colors each in accordance with one embodiment of the present invention.

FIG. 5 shows an exemplary beam layout in accordance with one embodiment of the invention. The two-dimensional area of the figure represents a portion of the surface of the Earth. In one embodiment, the portion of the surface of the Earth system is serviced by three gateways, each located within a feeder beam. The three feeder beams are represented by three blank circles 115-1 to 115-3. The feeder beams can be geographically separated from each other and from the service beams. The spatial separation can be for many reasons such as enabling frequency re-use among the gateways and the service beams, geographical diversity (weather, etc.), and/or others. In one embodiment, each gateway services four service beams, each beam is associated with a color. The four colors will be re-used for the three gateways for a total of 12 service beams. The distribution of the beams from each gateway can be performed in many equivalent ways. In one embodiment, a gateway located in beam 115-1 may service a service area that is covered by spot beams 501-1, 501-2, 501-3, and 501-4. Similarly, a gateway located in beam 115-2 may service a target service area that is covered by spot beams 502-1, 502-2, 502-3, and 502-4, and gateway located in beam 115-3 may service a target service area that is covered by spot beams 503-1 to 503-4. In other embodiments of the invention, the color reuse pattern may include three colors, two colors, and even one color. Typical satellite systems for distributing multimedia content and providing Internet access would employ a much larger number of service beams and/or gateways, but this simple system is used to develop the underlying concepts of the various aspects of the present invention.

Phased Stage Deployment

Figure 6:
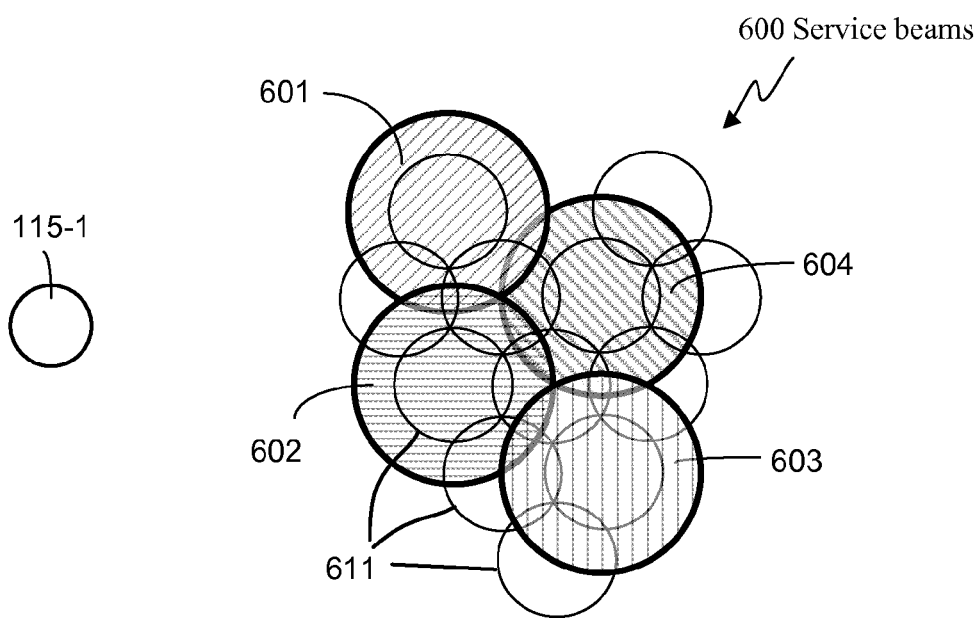
FIG. 6 shows an exemplary deployment of a single gateway at a phased build-out gateway system in accordance with one embodiment of the present invention.

FIG. 6 is a block diagram of an exemplary early phase deployment of a satellite communications system according to one embodiment of the present invention. In this embodiment, an initial deployment of gateway or gateways deliver a small number of large early stage beams distributed over an initial service area that typically covers a significant portion of the full service area. The initial deployment locates a primary gateway and/or perhaps a spare gateway with the same feeder beam, which is shown as circle 115-1. The spare gateway can substitute for the primary gateway should the primary gateway fail to function properly. The spare gateway may be located at a distance from the primary gateway but still within the feeder beam so that the spare can be used when the primary is impaired by weather. In one embodiment, the feeder beam 115-1 may be geographically separated from the service beams in order to allow for re-use of the allocated service beam frequencies for the feeder beams. The primary (first) gateway delivers information data to at least one first spot beam, which illuminates at least one first footprint. In one embodiment, the at least one first feeder beam includes four large service beams 601, 602, 603, and 604 that cover the vast majority of the target service area. Each service beam uses a different color. In one embodiment, the service beams may be overlapping. In yet another embodiment, the beams may not overlap. At a later time, the system may add a second gateway, which may be located at a second feeder beam (not shown) to provide higher capacity as the number of subscriber terminals in the target service area increases and/or gateway redundancy in case where a failure occurs at the primary gateway. In one embodiment, four separate colors on the service spot beams 601, 602, 603, and 604 can be used. Each service spot beam may be enlarged in a number of ways. In one embodiment, the transmission power of the service spot beam can be increased. In another embodiment, service spot beams with the same color can be pointing to the same footprint or they may be pointing to spatially separated footprint (for frequency reuse). In yet another embodiment, the multi-beam antenna may change the focus pattern of the beams. The concept of changing focus pattern is illustrated with 12 smaller beams (partially overlapping thin-lined circles 611 in FIG. 6).

In one embodiment of the present invention, service beams can be enlarged using an Adaptive Coding and Modulation (ACM) scheme. The link channel quality can be estimated by subscriber terminals directly from information signals received from forward downlink 150 and reported back to gateway 115, or by the satellite itself using return uplink 145. The link channel quality can also be estimated at gateway 115. In one embodiment, gateway 115-1 may assign an adaptive coding and modulation (modcode) scheme based on the scheme shown in FIG. 2B to corresponding subscriber terminals. In another embodiment, the satellite 105 may assign a modcode to subscriber terminals. The link signal quality can be, for example, the average value of multiple measured link signal-to-interference-plus-noise ratio (SINR) values. In order to reduce the amount of traffic in the channel, the reporting may occur only in case of SINR variations exceeding a certain range (signal quality range). For example, if a destination link has a signal quality within range 7, the modcode QPSK ¾ may be used. In some embodiments of the present invention, one or more of the ranges may include a reliability margin (which may be beneficial when channel conditions are changing rapidly, for example). One or more of the ranges may be modified dynamically to adjust this reliability margin as well. Subscriber terminals are able to perform this modcode adaptation.

According to at least one embodiment of the invention, "enlarging" a service spot beam may refer to enlarging the effective coverage area associated with the service spot beam, without necessarily physically increasing the size or intensity of the service spot beam. This may be accomplished by use of ACM. For example, when a service spot beam is operated at a certain combination of coding and modulation, the service spot beam may be associated with a particular coverage area in which some subscriber terminals are served. By using ACM, the same service spot beam can be operated at a different combination of coding and modulation such that the service spot beam is associated with a larger coverage area in which more subscriber terminals may be served. This may be done by merely changing the coding and/or modulation used, without any change to the physical size or intensity of the service spot beam.

It should be readily apparent from the comparison of FIGS. 5 and 6 that if the small service beams associated with a gateway are adjacent, then the large service beams will greatly overlap, thus providing a smaller total coverage area than if the small service beams are separated.

Virtual Gateway Redundancy

Figure 7:
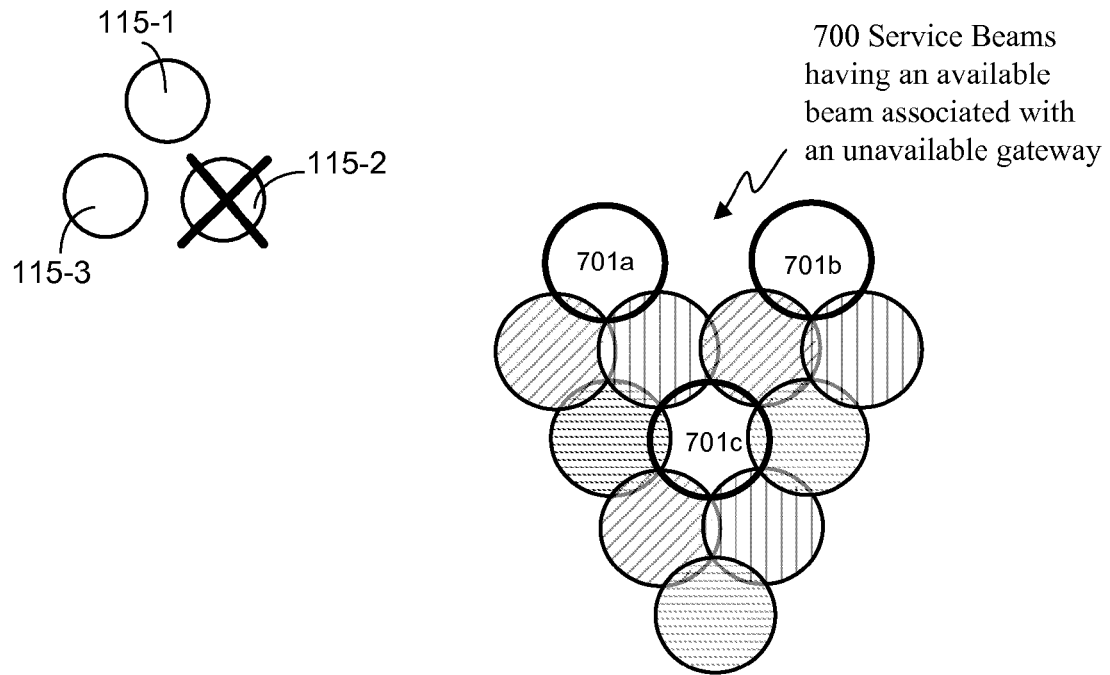
FIG. 7 shows an exemplary block diagram of a fully deployed system that experiences the failure of one of the gateways in accordance with one embodiment of the present invention.

FIG. 7 shows a block diagram of an example of a fully deployed satellite communications system that experiences the failure of one of the gateways. Here, the failed gateway is depicted by the X over the associated gateway beam 115-2. Gateways may fail for many reasons such as maintenance and lack of a spare, impairment of feeder beam due to bad weather, and/or others. In other words, although the service beams associated with the failed gateway are available, subscriber terminals within the covered areas won't be able to receive services because there is no information in the uplink (feeder link) between the failed gateway and the satellite. The service beams associated with the failed gateway are represented with blank circles 701*a-c*.

Figure 8:
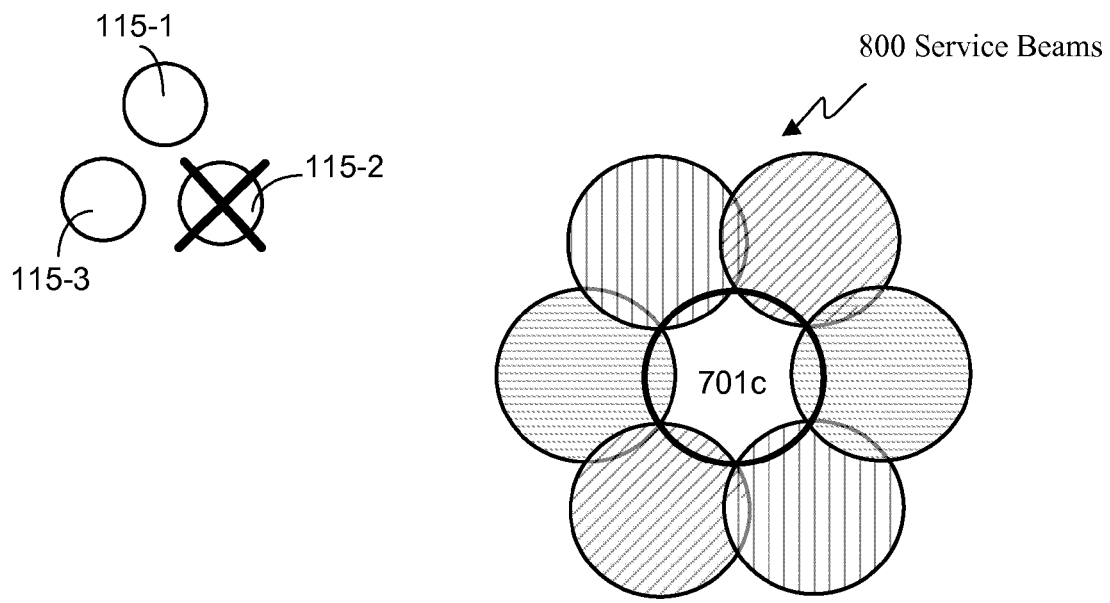
FIG. 8 shows the central beam associated with the failed gateway and the adjacent beams in accordance with one embodiment of the present invention.

FIG. 8 shows the central beam 701*c* of the failed gateway 115-2 and its adjacent beams (all other beams are omitted for clarity reason). In this exemplary embodiment, the central beam 701c is surrounded by 6 beams, 2 each of the 3 colors not used by beam 701c. Beams with the same color are located diagonally across beam 701c, i.e., with the largest possible distance for frequency re-use. It is understood that the number of colors are given for illustration only, and are not meant to be limitations of the present invention. The colors of the neighboring beams will vary with the color mapping scheme employed.

Figure 9:
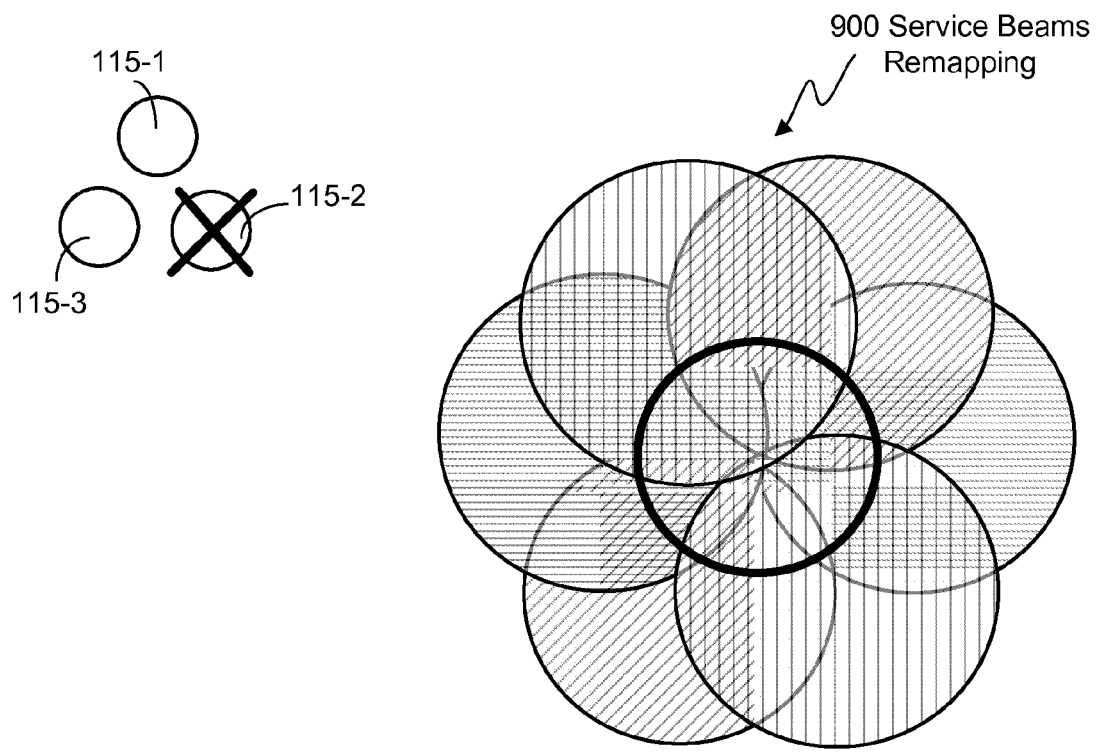
FIG. 9 shows a beam re-mapping in which all of the adjacent beams are enlarged and completely cover the central beam associated with the failed gateway of FIG. 8 in accordance with one embodiment of the present invention.

In accordance with one embodiment of the present invention, one or more of the neighboring beams can be expanded to cover parts of the blackout area (area associated with the unavailable gateway). FIG. 9 shows an exemplary beam re-mapping in which all of the adjacent beams are enlarged and completely cover the affected area in an overlapping fashion. In other embodiments, other types of re-mapping could be employed. For example, an operator could instruct the satellite to enlarge an operational service beam, which is adjacent to the affected beam, until it sufficiently covers the affected area. Or the multi-beam on-board of the satellite may be automatically programmed to enlarge one or more adjacent beams of the subject area upon discovery of the gateway failure by the satellite. Other combinations of beams adjustment can be employed as appropriate in the deployed system.

As mentioned previously, according to at least one embodiment of the present invention, "enlarging" a service spot beam may refer to enlarging the effective coverage area associated with the service spot beam, without necessarily physically increasing the size or intensity of the service spot beam. This may be accomplished by use of ACM. For example, when a service spot beam is operated at a certain combination of coding and modulation, the service spot beam may be associated with a particular coverage area in which some subscriber terminals are served. By using ACM, the same service spot beam can be operated at a different combination of coding and modulation such that the service spot beam is associated with a larger coverage area in which more subscriber terminals may be served. This may be done by merely changing the coding and/or modulation used, without any change to the physical size or intensity of the service spot beam.

Figure 10:
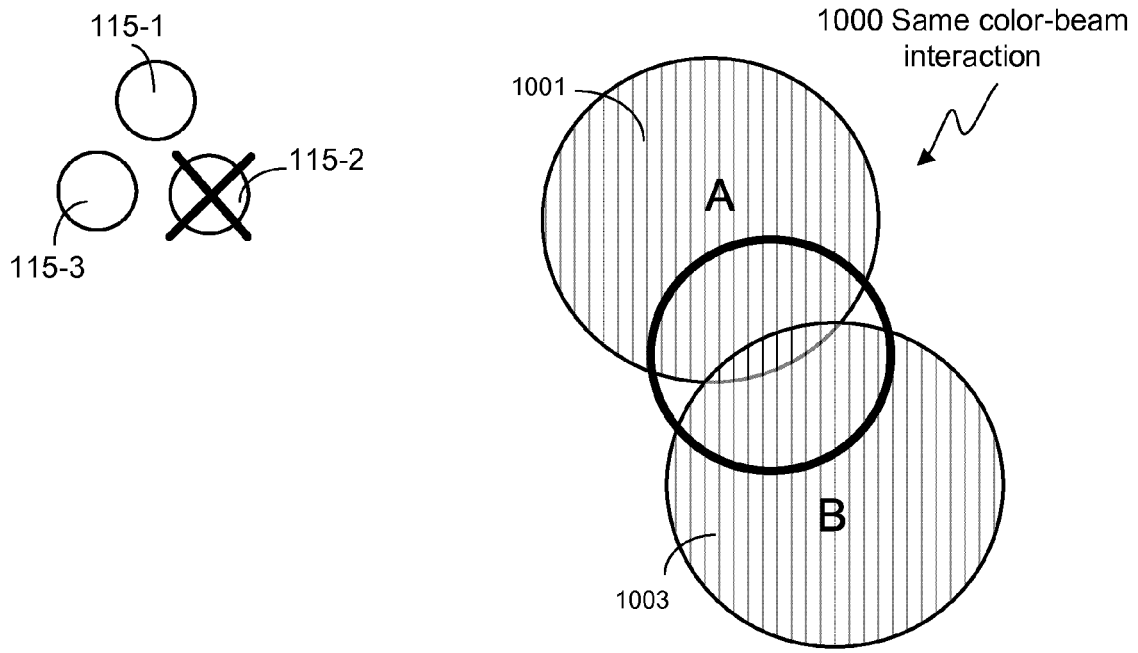
FIG. 10 shows a subset of the service beams from the exemplary block diagram of FIG. 9 to highlight the interaction of two beams having the same color in according with one embodiment of the present invention.

FIG. 10 shows a subset of the service beams from the exemplary block diagram of FIG. 9. In this exemplary diagram, two diagonal positioned service beams 1001 and 1003 having the same color (represented as vertical bars) will be expanded. These two beams almost completely cover the target area, so the system operator may alternately choose to operate the system with only these two beams expanded. However, the effect of interference of these two same colored beams must be considered, especially in the area where they overlap. There are multiple methods to alleviate the interference problem. In one embodiment, the adaptive coding and modulation scheme described above may be used. For example, a lower coding rate and lower-level of modulation will be used within the overlapped area where subscriber terminals may face the strongest interference noise. In another embodiment, two adjacent beams having different colors may be used.

Figure 11:
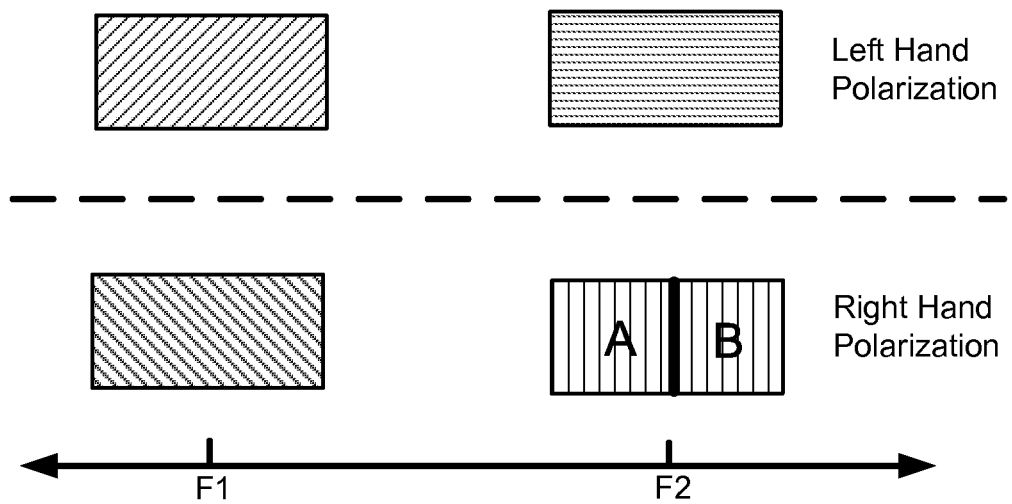
FIG. 11 shows an exemplary diagram of two beams having the same color of FIG. 10 by splitting the frequency band of the color into two sub-bands in accordance with one embodiment of the present invention.

In yet another embodiment of the present invention, the color of these two diagonal positioned beams can be separated by splitting the frequency band into two separate sub-bands. FIG. 11 shows a block diagram of an exemplary frequency band splitting, where the frequency band F2 is split into two smaller sub-bands A and B, each occupying a portion of F2 bandwidth. The two sub-bands may have equal frequency bandwidth or unequal bandwidth. This embodiment can be implemented if subscriber terminals in the subject area are able to re-tune their carrier frequency to the appropriate frequency, change their demodulator to the narrow bandwidth signal of their modem. In this case, the data rate of the subscriber terminals may be reduced due to the narrower available bandwidth.

Figure 12:
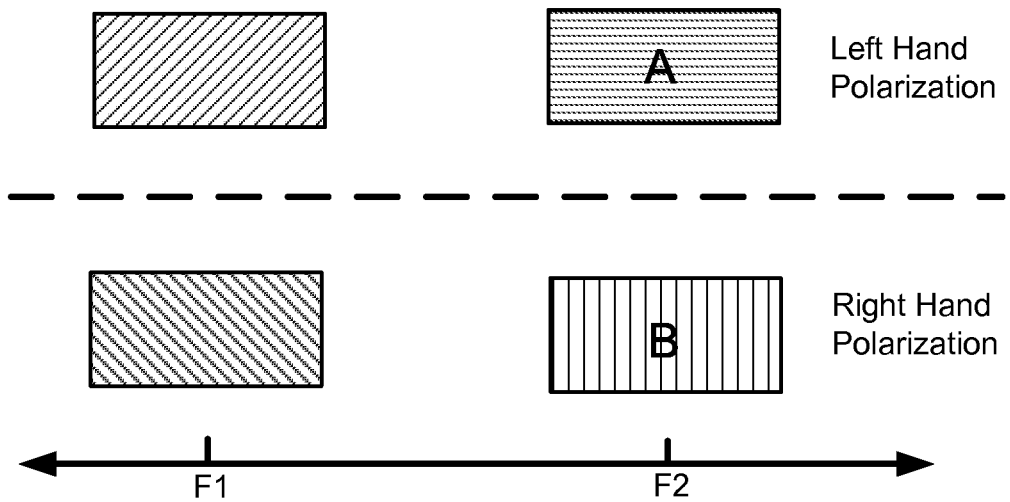
FIG. 12 shows an exemplary diagram of two same-color beams of FIG. 10 having orthogonal polarization in accordance with one embodiment of the present invention.

In another embodiment of the present invention, the system may employ polarization separation to preserve carrier frequency bandwidth, and therefore, the committed data rate or service capacity. This embodiment can be implemented if antennas of subscriber terminals in the subject area are able to separate polarized frequency channels (e.g., same frequency band with a right-hand and left-hand circular polarization). FIG. 12 shows an embodiment of the present invention, in which the two same colored neighboring beams are separated by polarization. Dual-polarization and dual-frequency carrier capable subscriber terminals will allow each to be migrated to any of the four beam colors.

In yet another embodiment of the present invention, the use of the adaptive coding and modulation (ACM) technique allows the migrated subscriber terminals to continue to operate on the neighboring beams during an outage of their home gateway, albeit at lower data rate due to the penalty in signal-to-noise ratio (SNR) and/or signal-to-interference-and-noise ratio (SINR). However, the SNR and/or SINR penalty can be dramatically reduced by means of efficient coding and modulation such as ACM and efficient decoding and demodulation techniques. The modulation and coding level can be dynamically adjusted accordingly to the link signal channel quality in order to maintain an average channel capacity. In one embodiment of the present invention, the available gateway, which serves as a redundant gateway to the failed gateway, may compute capacity to each current and migrated subscriber terminal within its now expanded service area and dynamically adapt the coding and modulation in order to provide an optimal capacity during outage periods.

As described previously, the use of dual-polarization (e.g., right-hand and left-hand circular polarization) and the two frequency bands allows each subscriber terminal in the affected area to migrated to any of the four colors. Likewise, the large dynamic range offered by a ground segment's employment of the ACM scheme allows the migrated subscriber terminals to continue to operate on the neighboring beams during an outage of their home gateway, albeit at lower coding and modulation rates and with a proportionately larger "drain" on neighboring beam capacity. This approach will require careful control and/or dynamic adjustment of carrier frequencies and symbol rates during outage periods. In consequence, a virtual gateway redundancy can be realized by exploiting the diversity advantage of spatially separated gateways, polarization and/or frequency diversity in a satellite communications system.

While the invention has been described with respect to exemplary embodiments, one skilled in the art will recognize that numerous modifications are possible. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A method for providing satellite communications coverage for a geographical area comprising:
    operating a satellite to generate at least one first spot beam and at least one second spot beam;
    operating a plurality of gateways including a first gateway and a second gateway;
    wherein the first gateway is configured to utilize the at least one first spot beam, the at least one first spot beam associated with at least one first coverage area within the geographic area to provide relayed satellite communications to a plurality of first subscriber terminals located in the at least one first coverage area;

wherein the second gateway is configured to utilize the at least one second spot beam, the at least one second spot beam associated with at least one second coverage area within the geographic area to provide relayed satellite communications to a plurality of second subscriber terminals located in the at least one second coverage area;

as part of a phased deployment, the at least one second coverage area is expanded to include at least one third coverage area within the geographic area, and the second gateway is configured to provide relayed satellite communications to the plurality of second subscriber terminals located in the at least one second coverage area and to a plurality of third subscriber terminals located in the at least one third coverage area;

wherein the at least one first coverage area, the at least one second coverage area, and the at least one third coverage area are different coverage areas within the geographic area; and wherein the plurality of first subscriber terminals, the plurality of second subscriber terminals, and the plurality of third subscriber terminals are different subscriber terminals.

2. The method of claim 1, wherein the at least one second spot beam comprises at least two second spot beams associated with at least two second coverage areas that are expanded as part of the phased deployment, wherein prior to expanding the at least two second coverage areas, the at least two second spot beams are configure to utilize a common color of frequency and polarization; and wherein upon expanding the at least two second coverage areas, the at least two second spot beams are configured to utilize distinct colors of frequency and polarization to reduce effects of interference with one another.

3. The method of claim 2 wherein upon expanding the at least two second coverage areas, the at least two second spot beams are configured to use separate frequency bands.

4. The method of claim 2 wherein upon expanding the at least two second coverage areas, the at least two second spot beams are configured to use different polarizations.

5. The method of claim 1 wherein adaptive coding and modulation (ACM) is used to expand the at least one second coverage area.

6. The method of claim 1 wherein increased transmission power is used to expand the at least one second coverage area.

7. The method of claim 1 wherein the at least one first coverage area is adjacent to the at least one second coverage area.

8. The method of claim 1 wherein the first and second gateways are interconnected through a communication network.

9. A satellite communications system for providing coverage for a geographical area comprising:
a satellite configured to generate at least one first spot beam and at least one second spot beam;
a plurality of gateways including a first gateway and a second gateway;

wherein the first gateway is configured to utilize the at least one first spot beam, the at least one first spot beam associated with at least one first coverage area within the geographic area to provide relayed satellite communications to a plurality of first subscriber terminals located in the at least one first coverage area;

wherein the second gateway is configured to utilize the at least one second spot beam, the at least one second spot beam associated with at least one second coverage area within the geographic area to provide relayed satellite communications to a plurality of second subscriber terminals located in the at least one second coverage area;

wherein as part of a phased deployment, the second gateway is operable to expand the at least one second coverage area to include at least one third coverage area within the geographic area, and the second gateway is configured to provide relayed satellite communications to the plurality of second subscriber terminals located in the at least one second coverage area and to a plurality of third subscriber terminals located in the at least one third coverage area wherein the at least one first coverage area, the at least one second coverage area, and the at least one third coverage area are different coverage areas within the geographic area and wherein the plurality of first subscriber terminals, the plurality of second subscriber terminals, and the plurality of third subscriber terminals are different subscriber terminals.

10. The satellite communications system of claim 9, wherein the at least one second spot beam comprises at least two second spot beams associated with at least two second coverage areas that are expanded as part of the phased deployment, wherein prior to expanding the at least two second coverage areas, the at least two second spot beams are configure to utilize a common color of frequency and polarization; and wherein upon expanding the at least two second coverage areas, the at least two second spot beams are configured to utilize distinct colors of frequency and polarization to reduce effects of interference with one another.

11. The satellite communications system of claim 10 wherein upon expanding the at least two second coverage areas, the at least two second spot beams are configured to use separate frequency bands.

12. The satellite communications system of claim 10 wherein upon expanding the at least two second coverage areas, the at least two second spot beams are configured to use different polarizations.

13. The satellite communications system of claim 9 wherein adaptive coding and modulation (ACM) is used to expand the at least one second coverage area.

14. The satellite communications system of claim 9 wherein increased transmission power is used to expand the at least one second coverage area.

15. The satellite communications system of claim 9 wherein the at least one first coverage area is adjacent to the at least one second coverage area.

16. The satellite communications system of claim 9 wherein the first and second gateways are interconnected through a communication network.

* * * * *